July 7, 1931.  E. R. BURTNETT  1,813,276
INTERNAL COMBUSTION ENGINE
Filed March 17, 1927  3 Sheets-Sheet 1
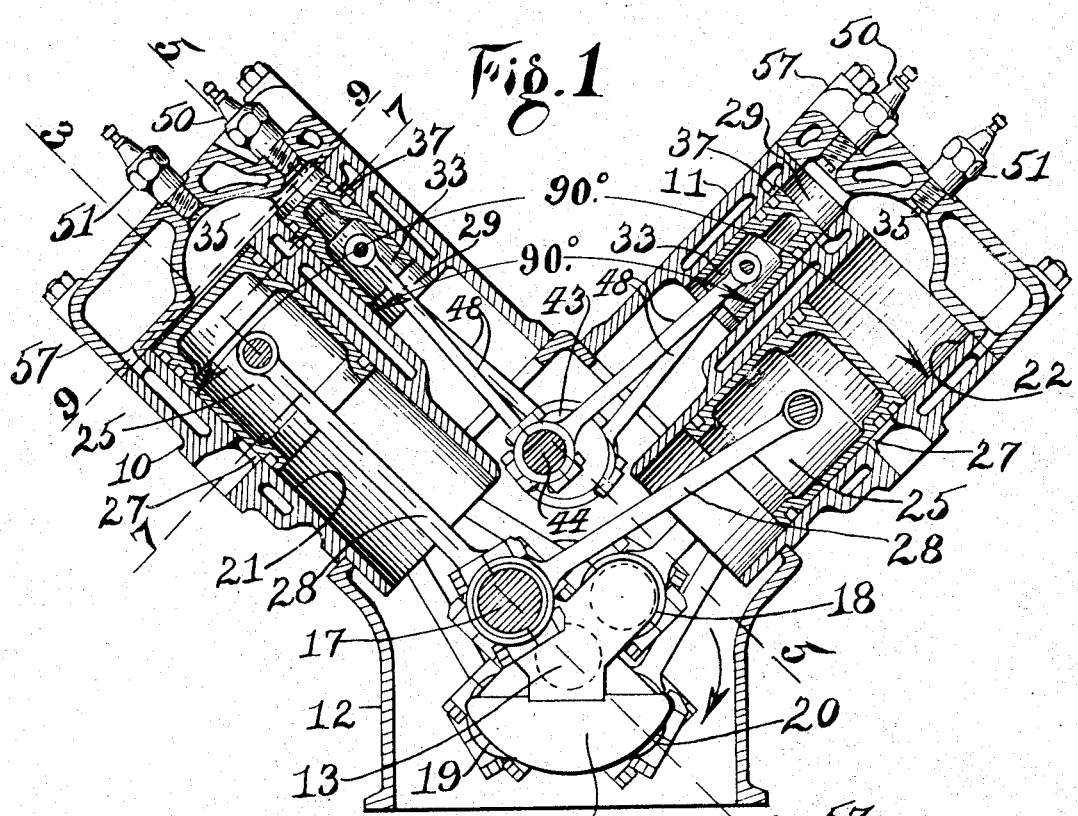
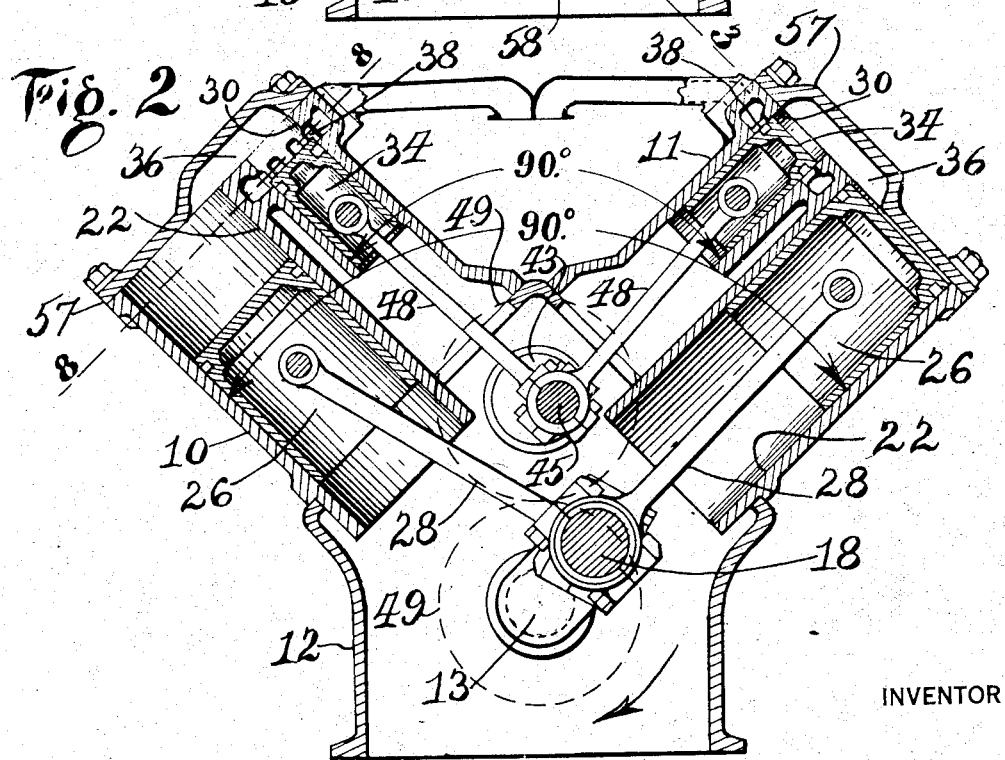
INVENTOR
Everett R. Burtnett

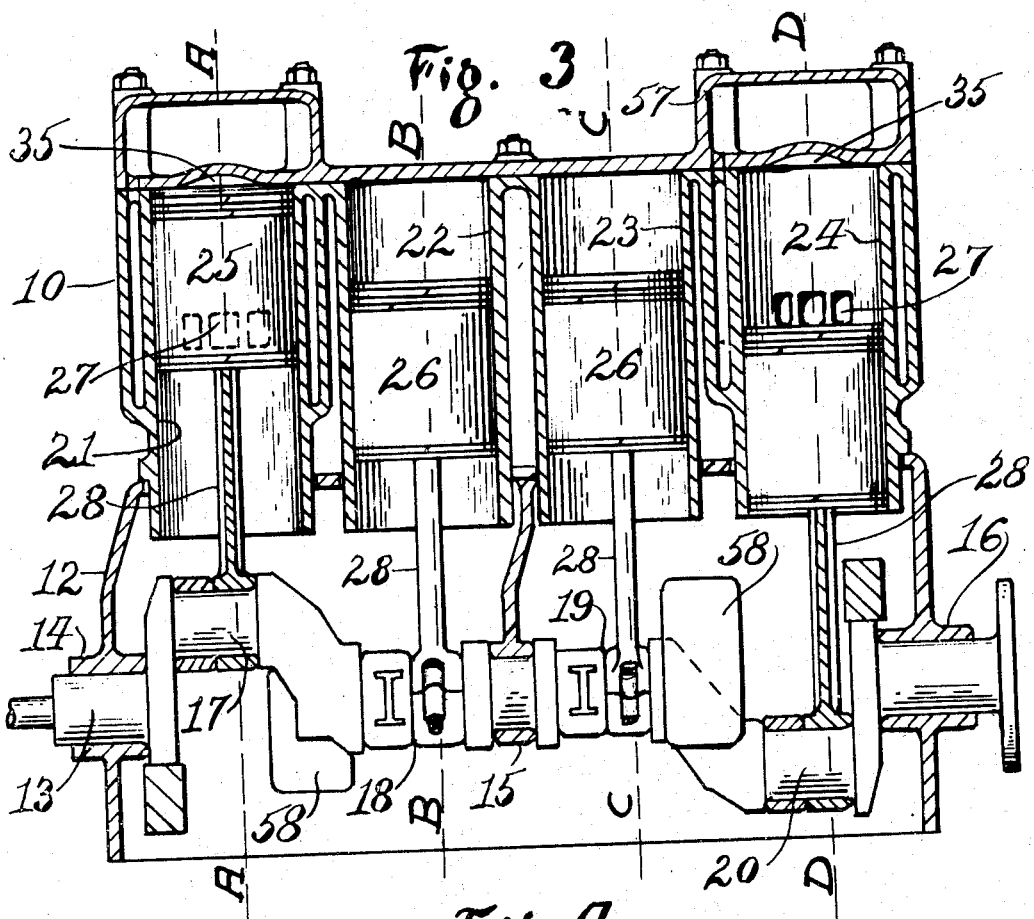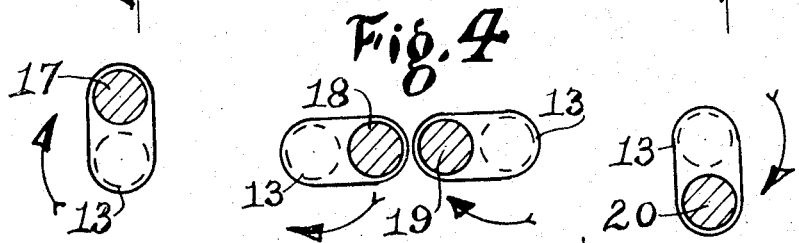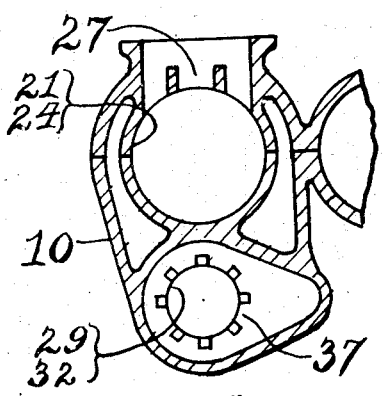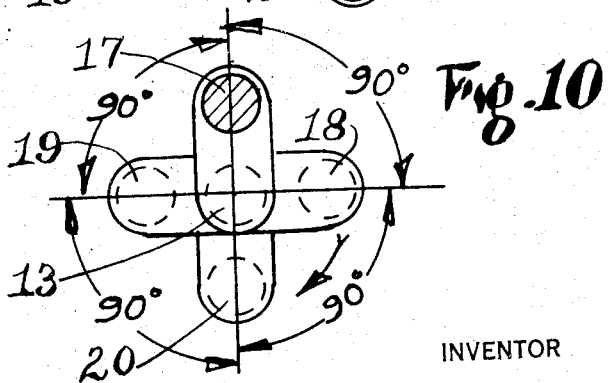

July 7, 1931. E. R. BURTNETT 1,813,276
INTERNAL COMBUSTION ENGINE
Filed March 17, 1927 3 Sheets-Sheet 3
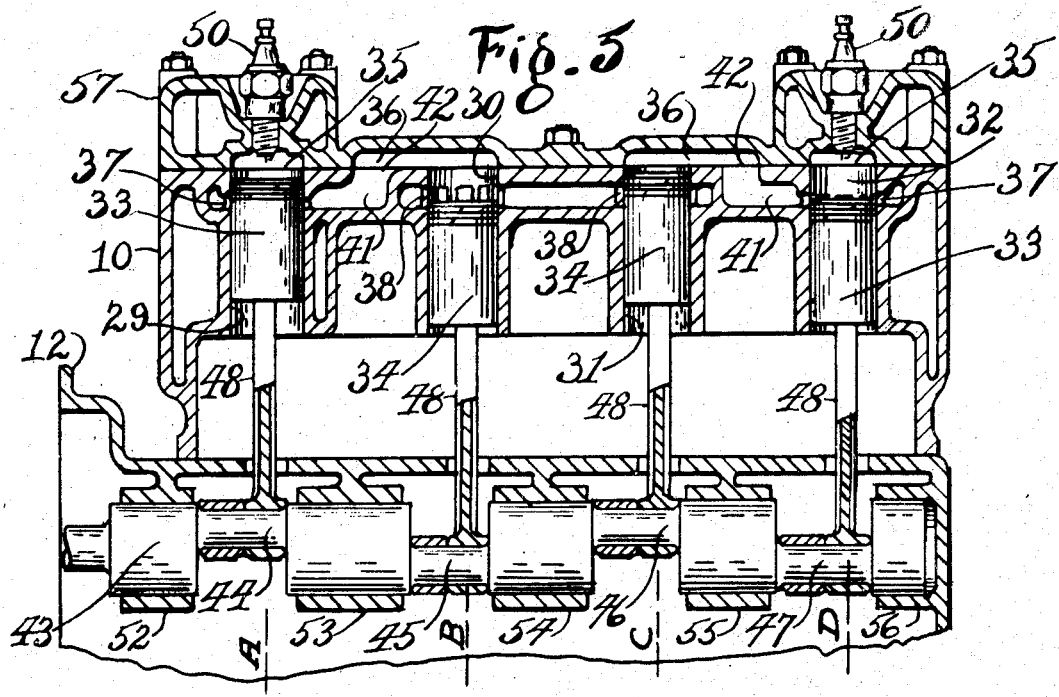
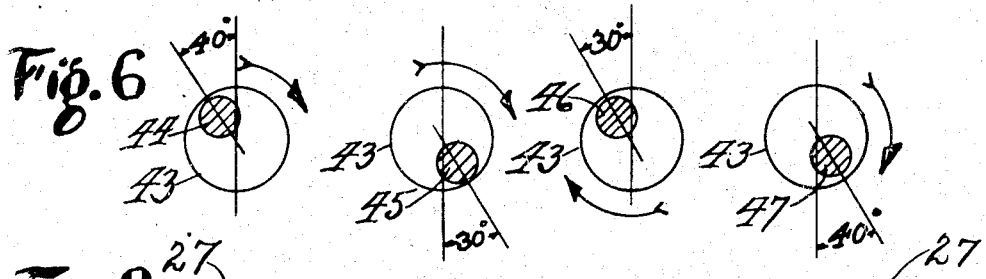
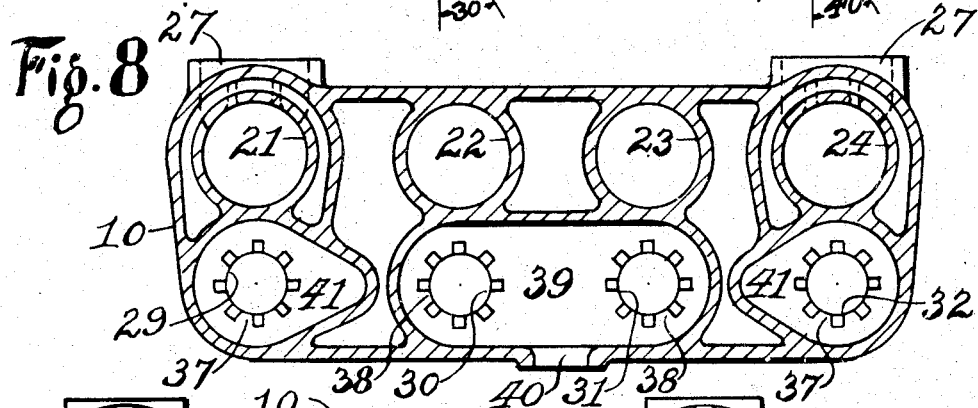
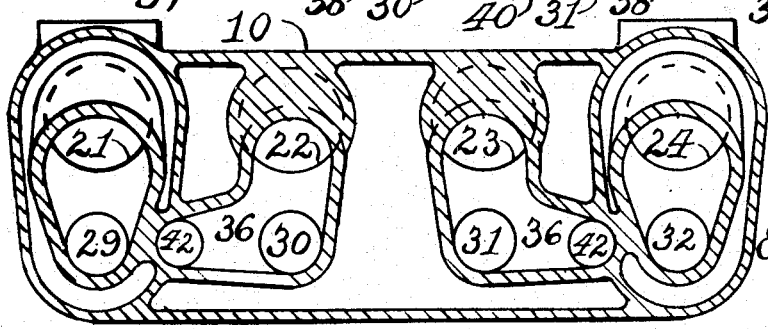
INVENTOR
Everett R. Burtnett Patented July 7, 1931

1,813,276

UNITED STATES PATENT OFFICE

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION OF NEVADA

INTERNAL COMBUSTION ENGINE

Application filed March 17, 1927. Serial No. 176,057.

My invention relates to internal combustion engines of the V-type cylinder construction wherein part of the cylinders are adapted to charge pumping and the remaining cylinders adapted to combustion, and has for its principal objects,—to generally improve upon and provide with increased mechanical and functional efficiency the two stroke cycle of power productivity.

Further objects of my invention are to provide a two stroke cycle internal combustion engine of sixteen cylinders, eight cylinders adapted to charge pumping and eight other cylinders adapted to combustion; the eight charge pumping cylinders being arranged in pairs of cylinders with the chambers respectively of pairs being commonly joined, the eight combustion cylinders being arranged in pairs of cylinders with the chambers respectively of pairs being commonly joined, the charge pumping and combustion pairs of cylinders being respectively alternately arranged in four radial rows and aggregating as a combined structure two V-disposed banks of twin rows of cylinders in combination with a main crank shaft having four relatively 90° spaced crank pins arranged in accordance with the 90° V-engine two plane type and an auxiliary crank shaft to which a part of the pistons are connected providing a balanced construction operatively relatively with regard to respective charge pumping, combustion function and mechanical forces.

A further object of my invention is,—to provide in a two stroke cycle multi-unit engine a relative constructional difference in size between the two cylinders comprising each commonly joined pair of cylinders, to associate the pistons of the relatively smaller cylinders with the auxiliary crank shaft, to provide fresh charge inlet ports in the walls of all the relatively smaller cylinders and exhaust ports in the walls of the relatively large cylinders which large cylinders are adapted to combustion, providing thereby inlet and exhaust port means to the cylinders as required to expedite the particular function to which a given cylinder is adapted, the pistons of the respective cylinders by their reciprocatory movement providing port valvular registration and cut off and augmenting the piston stroke sweep displacement effective in charge pumping or combustion expansion as the adaption may be.

A still further object of my invention is to provide with the combination of cylinders and pistons commonly joined and associated as described in the following specification a two stroke cycle engine of the piston type charge pump wherein pistons provide every valve requirement, inherently of positive and valve requirement, inherently of positive and silent mechanical operation, light of weight and corresponding reciprocatory inertia, of form which will effectively cool, lubricate, simple of construction and assembly and of relative operating arrangement providing a combination of forces which may be counterbalanced.

With the foregoing and other objects in view, my invention consists in certain novel features of construction and arrangement of parts that will be hereinafter more fully described and claimed and illustrated in the accompanying drawings in which:

Fig. 1 is transverse vertical section taken through the centers of one relatively radially formed group of cylinders adapted to combustion and indicated in relative location on lines A—A and D—D of Fig. 3.

Fig. 2 is a transverse vertical section taken through the centers of one relatively radially formed group of cylinders adapted to charge pumping and indicated in relative position longitudinally with respect to the engine as groups of likeness on lines B—B and C—C of Fig. 3.

Fig. 3 is longitudinal section taken through the center of four cylinders comprising one row of relatively larger cylinders, the cutting edge being indicated by line 3—3 of Fig. 1.

Fig. 4 is a diagrammatic view graphically illustrating the relative rotational position of the four cranks of the main crank shaft, the direction of rotation being indicated by the arrows.

Fig. 5 is a longitudinal section taken through the center of four cylinders comprising the relatively smaller cylinders embodied in each of the V-disposed groups, the cutting edge being taken on line 5—5 of Fig. 1.

Fig. 6 is a diagrammatic view graphically illustrating the relative position of the cranks of the auxiliary crank shaft.

Fig. 7 is a horizontal cross section taken on line 7—7 of Fig. 1 illustrating the plan of inlet and exhaust ports of a pair of cylinders commonly joined and adapted to combustion.

Fig. 8 is a horizontal cross section taken on line 8—8 of Fig. 2 illustrating in plan the fresh charge inlet passages related to the inlet ports of the row of relatively smaller cylinders.

Fig. 9 is a horizontal cross section taken on line 9—9 of Fig. 1 illustrating in plan the formation of the clearance chambers which commonly join the pairs of cylinders respectively adapted to charge pumping or combustion.

Fig. 10 is a condensed diagrammatic view illustrating the relative position rotatively of the four crank pins of the main crank shaft.

Referring by numerals to the accompanying drawings 10 and 11 are cylinder blocks respectively of like construction, the two cylinder blocks surmount a crank case 12 with a respective angular divergence of 90°.

A main crank shaft 13 is journaled in main bearings 14, 15 and 16, the main bearings being secured in the crank case 12.

Four crank pins 17, 18, 19 and 20 are formed of the main crank shaft 13, the circumference of the crank shaft being divided by four, creating equally thereby the respective positions of the four main crank pins relatively rotatively, the end crank pins 17 and 20 being relatively of rotary position diametrically opposite, the two center main crank pins being relatively of rotary position diametrically opposite, the four main crank pins being arranged in two planes, the two end crank pins occupying one plane, the two center crank pins occupying the other of the two planes and the axes of the two planes being relatively at right angle.

Four main cylinders 21, 22, 23 and 24 are formed in each of the two cylinder blocks, the four main cylinders embodied in a given block being respectively arranged in a row, the axes of the row of main cylinders being parallel with the axis of the main crank shaft and the main cylinders of each of the two rows being arranged relatively with respect to rows of 90° angular divergence with the respective main cylinder axes intersecting the axis of the main crank shaft.

Two of the main cylinders 21 and 24 of each row of main cylinders are adapted to combustion, the remaining two main cylinders 22 and 23 of each row of main cylinders are adapted to charge pumping, the main power pistons 25 are arranged for reciprocatory movement within each of the main cylinders 21 and 24 of each row adapted to combustion and main charge pump pistons 26 are arranged for reciprocatory movement within each of the main cylinders 22 and 23 adapted to charge pumping.

Exhaust ports 27 are formed through the walls of each of the main cylinders 21 and 24 of each of the two rows at a point in the cylinder that the said exhaust ports will be wholly uncovered by the main power piston of the respective cylinder only at the time the said piston is in a position of crank end of the stroke. The four main power pistons 25 are connected to the two main cranks 17 and 20 by connecting rods 28.

Four auxiliary cylinders 29, 30, 31 and 32 are formed in each of the two cylinder blocks 10 and 11, the said auxiliary cylinders being arranged in a row, the axis of a given row of auxiliary cylinders being substantially parallel with the axis of the adjacent row of main cylinders. The auxiliary cylinders are arranged, one auxiliary cylinder adjacent one main cylinder and respectively in the same transverse plane. The chambers of each adjacent pair of cylinders embodying one main and one auxiliary cylinder of a given transverse plane are commonly joined by a single compression clearance chamber.

Obviously the two chambers and the two pistons of any given commonly joined pair of relatively transversely arranged cylinders form a dual construction to a common function, providing thereby compression and expansion respectively by units of dual piston stroke sweep to each common combustion chamber and fresh charge pumping respectively by units of dual piston stroke sweep to each common fresh charge pump clearance chamber.

Auxiliary power pistons 33 are arranged for reciprocatory movement within each of the auxiliary power cylinders 29 and 32 and auxiliary fresh charge pumping pistons 34 are arranged for reciprocatory movement within each of the auxiliary fresh charge pumping cylinders 30 and 31.

Common clearance chambers 35 join the chambers of each adjacent main and auxiliary power cylinder.

The common clearance chambers 36 join the chambers of each adjacent main and auxiliary fresh charge pumping cylinder.

Fresh charge inlet ports 37 are formed through the wall of each of the four auxiliary power cylinders 29 and 32 of each block. Fresh charge inlet ports 38 are formed through the wall of each of the four auxiliary fresh charge pumping cylinders 30 and 31. The inlet ports of each of the auxiliary power or auxiliary fresh charge pumping cylinders being formed at a point in the respective auxiliary cylinders that the respective inlet ports will be wholly uncovered by the associated piston of the given cylinder only at the time the said piston is in a position of crank end of the stroke.

A fresh charge inlet passage 39 is formed in each block in communication with the inlet ports 38 of each of the auxiliary fresh charge pumping cylinders, an opening 40 is formed through the outer wall of each block, providing an external port of the inlet passage 39 to which a fresh charge supply pipe may be attached.

A fresh charge transfer passage 41 is formed in communication with the inlet ports 37 of each of the four auxiliary power cylinders 29 and 32 of each block, each fresh charge transfer passage 41 is formed in communication with the fresh charge clearance chamber 36 of the respective adjacent main and auxiliary fresh charge pumping cylinders by openings 42 formed respectively through the top face of the cylinder blocks.

An auxiliary crank shaft 43 is arranged in the crank case with axis parallel with the main crank shaft 13, four crank pins 44, 45, 46 and 47 are formed of the auxiliary crank shaft 43, the pistons of the auxiliary cylinders are connected to these crank pins by connecting rods 48, the auxiliary power pistons 33 in radial transverse V-related pairs are connected to the two auxiliary crank shaft crank pins 44 and 47 respectively in pairs to each crank pin.

The auxiliary fresh charge pumping pistons 34 in radial transverse V-related pairs are connected to the two auxiliary crank shaft crank pins 45 and 46 respectively in pairs to each crank pin. The four auxiliary crank pins 44, 45, 46 and 47 are relatively rotatively arranged with relation to the rotary movement of the main crank shaft 13 by timing gear means 49 connecting the two shafts in one to one rotary relation that the auxiliary power pistons will be respectively in associated function related pairs of substantially synchronous stroke movement with the main power pistons and the auxiliary fresh charge pumping pistons respectively in associated function related pairs with the main fresh charge pumping pistons relatively of stroke movement that will provide the registration of the inlet ports 38 respectively of each given unit with the respective fresh charge pumping chamber for the period corresponding substantially with the crank stroke movement of the related main fresh charge pumping piston, providing thereby fresh charge admission port actuating means to the fresh charge pumping units.

An ignition device 50 is secured in the cylinder head of each combustion chamber, a second ignition device 51 is also provided, for dual ignition operation if desired.

The auxiliary crank shaft 43 is journaled in main bearings 52, 53, 54, 55 and 56, the said bearings being secured to the cranks case.

A cylinder head 57 is preferably arranged detachable with the cylinder blocks. Counterweights 58 providing counterbalance against the reciprocatory forces in addition to the out of balance rotary mass in a given plane are provided to the crank shaft.

There are two of these counterbalancing weights, one being located on the crank shaft between the crank pins 17 and 18 and the other between the crank pins 19 and 20.

The weight that is located between the crank pins 17 and 18 is disposed radially 120° from said crank pins and the counterweight that is arranged between the crank pins 19 and 20 is disposed radially 120° from said last mentioned crank pins. Said counterbalancing weights are disposed diametrically opposite to each other.

The operation of my improved two stroke cycle internal combustion engine is as follows:

Assuming the parts to be in the respective and relative position as shown in the accompanying drawings, an adjacent pair of commonly joined cylinders of either block comprising a given function related unit, the main and auxiliary power pistons 25 and 33 of the main and auxiliary power cylinders 21 and 29 respectively being as illustrated by Fig. 1 in the position substantially of head end stroke center.

The relative stroke position of the main and auxiliary fresh charge pumping pistons 26 and 34 of the main and auxiliary fresh charge pumping cylinders 22 and 30 respectively being substantially one-half outward on the crankward stroke. In the common clearance chamber 35 to the power cylinders 21 and 29 the fresh gases are compressed and at this moment ignition is timed to occur while in the common clearance chamber 36 of the pumping cylinders 22 and 30 a fresh charge is being drawn into the respective cylinder chambers commonly joined by the induction influence of the increasing chamber displacement due to the crankward movement of the pair of pistons, the fresh gases being admitted to the pumping chamber through the inlet ports 37.

With further rotation of the crank shaft, the gases of combustion in the chamber 35 forcing the power pistons 25 and 29 outward through their respective cylinders, the main power piston 25 reaching a point of the crankward stroke very closely approaching crank end dead center, the headward edge of the said piston 25 passing crankwardly beyond the headward edge of the exhaust ports 27 of the respective power cylinder, a few degrees later a like manner of port opening is accomplished of the inlet ports 37 in the wall of the associated auxiliary power cylinder by the crankward stroke movement of the auxiliary power piston 33, the combustion chamber is thus open to the function of scavenging.

At this moment the main fresh charge pumping piston 26 of the pumping cylinder 22 is being moved through the first half of the headward or compression stroke, the auxiliary pumping piston 34 leading in movement correspondingly with the main pumping piston of the given unit relatively a few degrees earlier.

Upon the arrival of the auxiliary pumping piston 34 substantially at one-half headward stroke the inlet ports 38 are cut off of registration with the respective pumping chamber, it follows that the compressing effect incurred thereafter within the pumping chamber by the further headward movement of the associated pair of pumping pistons effects the transfer of the fresh charge contents of the said pumping cylinders into the combustion chamber 35 of the adjacent pair of power cylinders 21 and 29, through the inlet ports 37, the transfer taking place through the opening 42 and the passage 41 respectively communicative with the given related units.

The induction of the fresh charge taking place at a remote end of the combined dual cylinder formed chamber develops a uniflow scavenging effect upon the residual products of combustion content of the combustion chamber, the exit of the spent products taking place through the exhaust ports 27 at a point relatively of the extreme end of the combined chamber from the inlet ports.

Very soon after the main and auxiliary pistons 25 and 33 are moved away from crank end dead center occupying the initial position of headward stroke movement, these pistons respectively cut off registration of the exhaust and inlet ports 27 and 37 with the combustion chamber, compression following within the combustion chamber 35 to the point initial with respect to the foregoing operation description.

A like series of function is developed between each of the adjacent related pump and power cylinder units relatively of 90° crank rotation spacing in engine speed time successively.

An engine of my improved construction is comparatively simple, may be easily and cheaply produced, is provided with a strong, rugged, positively acting and noiseless valvular arrangement for controlling the admission and transfer of gaseous fuel and the exhaust of the spent gases, which valvular arrangement is effective in pumping as an auxiliary member, power transmission as an auxiliary member, being in nature of construction and size with respect to the main or auxiliary parts respectively of a kind interchangeable, the engine being of high efficiency and improved operative refinement.

It will be understood that minor changes in the size, form and construction of the various parts of my improved engine may be made and substituted for those herein described without departing from the spirit of the invention, the scope of which is set forth in the appended claim.

I claim as my invention:

In a two stroke cycle internal combustion engine, eight main cylinders, arranged in two rows, four cylinders in a row, the planes occupied by the axes of the two rows of cylinders being disposed 90° apart, eight auxiliary cylinders disposed in two rows of four cylinders each, one auxiliary cylinder being disposed immediately above each main cylinder, thereby forming four units, each comprising four cylinders that are arranged in pairs, each pair comprising a main cylinder and an auxiliary cylinder, the two pairs of cylinders at each end of the structure functioning as combustion units, the intermediate pairs of cylinders functioning as charge pumping units, pistons arranged for operation within all of the cylinders, a crank shaft having four throws arranged ninety degrees apart, connections from two pistons within the main cylinders, one in each row of main cylinders to each crank throw, gaseous fuel inlet ports formed in the walls of the auxiliary cylinders, the pistons in the auxiliary cylinders functioning as valves for opening and closing said ports for controlling the passage of charge volumes to the pumping cylinders and to the combustion cylinders, a cam shaft, connections from said cam shaft to the crank shaft, whereby said cam shaft operates synchronously with said crank shaft, connections from said cam shaft to said piston valves, the main cylinders of the combustion units being provided intermediate their ends with exhaust ports that are open when the pistons within said cylinders are at the crankward limit of their respective cylinders, and counterbalancing weights mounted on the crank arms between each pair of crank throws and which counterweights are disposed 120° from the crank pins of the adjacent crank throws.

In testimony whereof I affix my signature.

EVERETT R. BURTNETT.